E. BLOOM & F. BARTH.
FEED TROUGH.
APPLICATION FILED NOV. 21, 1916.

1,227,524.

Patented May 22, 1917.
2 SHEETS—SHEET 2.

Witness
Frederick W. Ely
T. L. Mockbee

Inventors
Frank Barth.
Elza Bloom.
By Victor J. Evans
Attorney

UNITED STATES PATENT OFFICE.

ELZA BLOOM AND FRANK BARTH, OF UPPER SANDUSKY, OHIO.

FEED-TROUGH.

1,227,524.             Specification of Letters Patent.      Patented May 22, 1917.

Application filed November 21, 1916. Serial No. 132,710.

*To all whom it may concern:*

Be it known that we, ELZA BLOOM and FRANK BARTH, citizens of the United States, residing at Upper Sandusky, in the county of Wyandot and State of Ohio, have invented new and useful Improvements in Feed-Troughs, of which the following is a specification.

This invention relates to feed troughs intended for use in feeding animals and more especially adapted for the feeding of hogs.

One of the objects of the invention is to provide a trough having a detachable feed supply hopper, wherein the supply of feed to the feeding unit may be regulated.

A further object of the invention is the provision of a trough provided with means for separating animals in order that an individual compartment may be provided for each.

A still further object of the invention is to provide a trough of this character in which the different parts or units of which it is composed may be taken apart or separated for the purpose of cleaning the same, in order that the animals may be fed in a safe and sanitary manner.

A still further object is the provision of a trough of simple and economical construction, so arranged that should any of the parts become broken or destroyed they may be easily replaced.

With the above objects in view the invention consists broadly of a feed trough comprising a feeding unit provided with individual feed compartments, a feed supply hopper detachably connected thereto and means for controlling the amount of feed supplied to the said feeding means.

In the drawings;

Fig. 3 is a similar view taken on a line with the stationary middle partition which divides the feeding unit into separate compartments;

Figure 1:
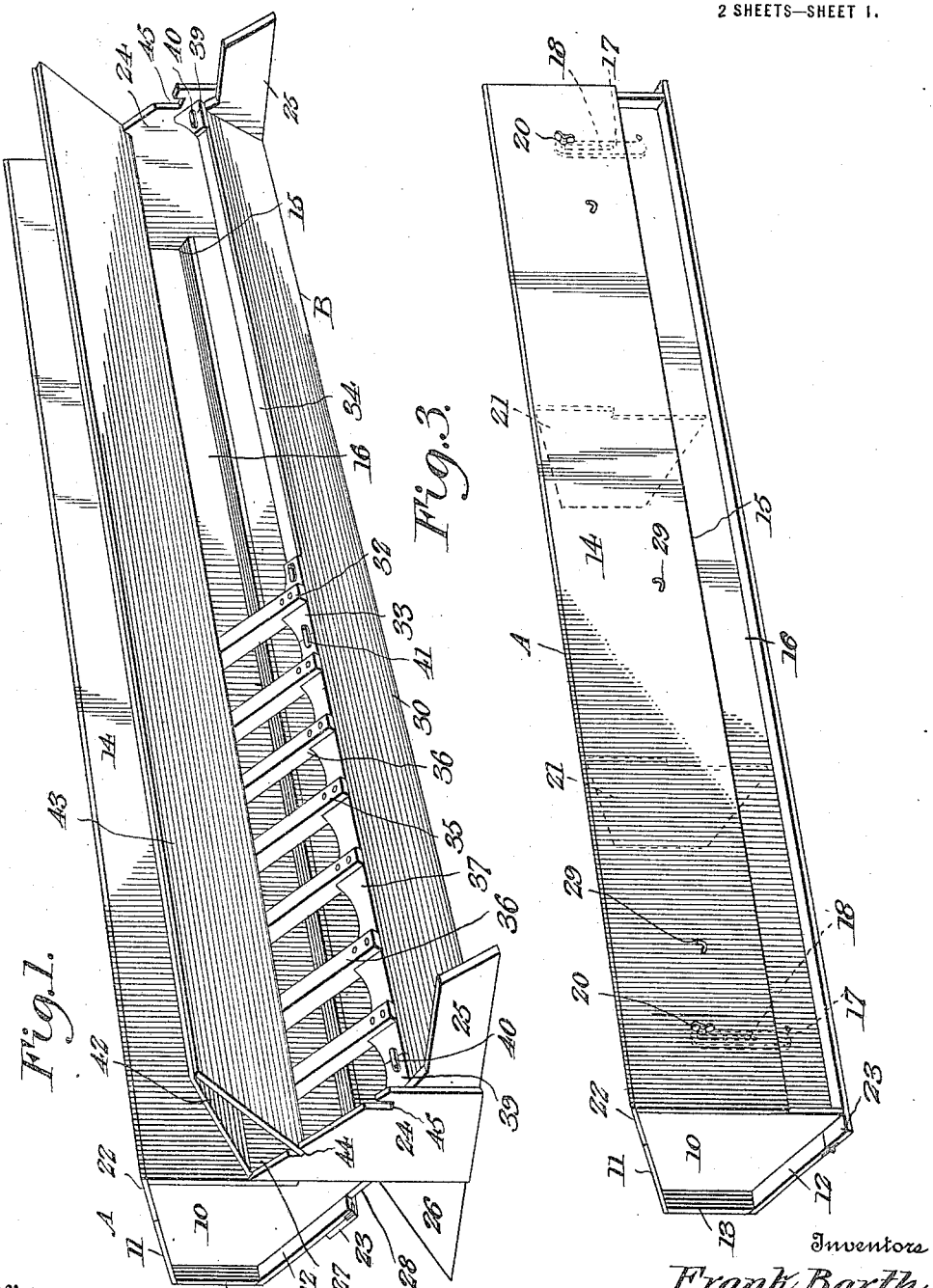
Figure 1 is a perspective view of a feed trough embodying the present invention shown set up and ready for use.
Figure 2:
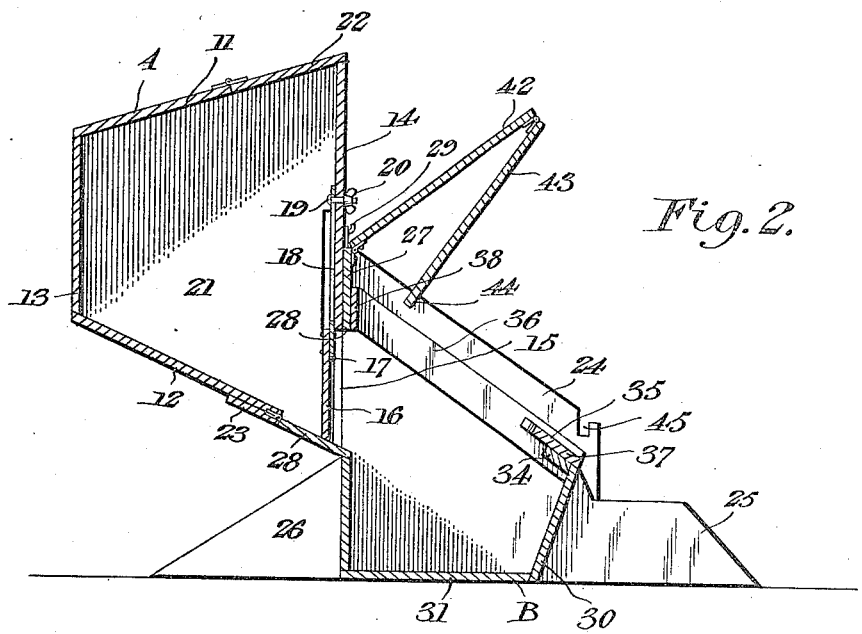
Fig. 2 is an enlarged transverse sectional view of the same taken on a line through the detachable sectional separating feed racks.
Figure 4:
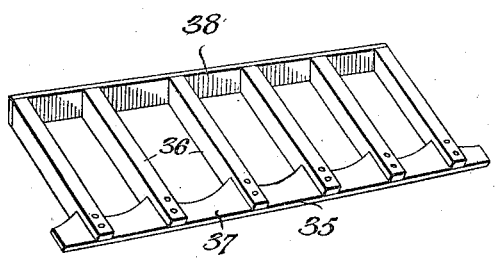
Fig. 4 is a perspective view of the detachable feed supply hopper detached from the feeding unit.
Figure 5:
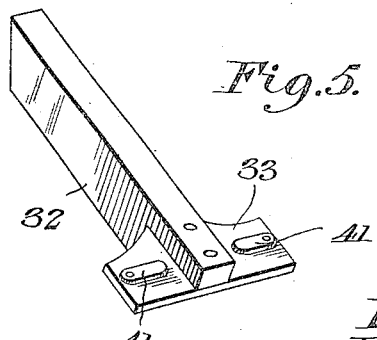
Fig. 5 is a detail perspective view of the detachable sectional separating rack.

Referring to the drawings in detail the detachable feed supply hopper is shown at A and the feeding unit at B.

The feed supply hopper A comprises a longitudinally disposed hopper or compartment formed of end members 10, an inclined top 11, an inclined bottom 12, a back 13 and a front 14. The front 14 terminates some distance from the bottom 12 in order to form an elongated opening 15 adapted for the passage of the feed from the hopper to the feeding unit to be presently described. The opening 15 is provided with an adjustable feed-controlling means, consisting of a closure 16, provided with slotted strips 17 near its ends. The slots 18 of the strips are adapted to take over bolts 19 provided with thumb nuts 20, for the purpose of adjusting the closure 16, in order to regulate the amount of feed passing through the opening. As before stated the bottom 12 is inclined, and this inclination serves to direct the flow of the feed to the opening 15 by gravity. The feed hopper is divided into compartments by the partitions 21 and is further provided with a hinged lid 22, for the purpose of closing the opening in the top 11 by means of which feed is placed within the hopper. The inclined bottom 12 of the hopper also terminates a short distance from the front 14 to further enlarge the feed opening 15, and this opening is provided with a hinged bar 23 by means of which the opening may be closed when the supply hopper is detached from the feed unit.

The feed unit B comprises end members 24, said members having front and rear extensions 25 and 26 for the purpose of supporting the feeding unit. The rear wall 27 of the feeding unit is formed with longitudinal openings 28, adapted to register with the opening 15 of the feed supply hopper, when the said hopper is in position, and for the purpose of supporting the said hopper in engagement with the feeding unit, the rear wall 27 is provided with an inclined flange or shelf 28 upon which the front edge of the hopper will rest. Suitable securing means such as hooks 29, or other devices may be used for holding the supply hopper within engagement with the feeding member. The front wall 30 is inclined with respect to the bottom 31 of the feed unit, and is shorter than the rear wall 27, to provide an inclined top for the said unit. Located centrally of this unit is a transverse stationary partition 32, the said partition occupying the entire cross sectional area of the unit, to divide the same into separate feeding chambers. The partition 32 is bifurcated for the reception of an attaching member 33, which extends upon each side of the partition to provide wings, by means of which said partition is attached to a longitudinally disposed strip 34 carried by the front wall 30, the said strip extending inwardly and being located slightly below the upper edge of the said wall. Each of the compartments of the feeding unit is provided with a detachable sectional supporting rack 35, consisting of transverse bars 36, bifurcated at their front ends to receive a connecting strip 37, by means of which this end of the rack is supported upon the strip 34. The rear end of the bars 36 are connected by means of a strip 38, and this end of the strip is detachably supported in any convenient manner upon the rear wall 27 of the unit. Located upon the strip 34 at each end of the trough are end blocks 39 adapted to abut the ends of the connecing strip 37, the said blocks carrying buttons 40 by means of which the front end of the racks are detachably held within the trough. Similar buttons 41 are carried by the support 33 for the purpose of securing the racks at this end. The connecting strip 37 is rounded out between the bars 36 in order to provide a convenient entrance for the head of the animal. A folding lid is hinged to the top of the rear wall 27, and is composed of a rear section 42 and a front section 43, and when this lid is opened as shown in Fig. 1 the front section is adapted to enter notches 44 formed in the end members 24 for the purpose of holding this lid in its open position. Other notches 45 may be provided in the end members 24, by means of which the lid may be adjusted in a manner to prevent the animals feeding and at the same time not entirely close the trough.

It is thought from the foregoing description that the construction and use of the invention will be plain and that a further description is unnecessary. The right is reserved to make such changes in the form and proportion of invention as will properly fall within the scope of the appended claim.

Having described the invention what we claim is;

A feed trough comprising a feeding unit, provided with a longitudinal opening in its rear wall, a transverse partition for dividing the said unit into separate compartments, detachable sectional supporting racks for each of the said compartments, a feed supply hopper provided with a longitudinal opening, adapted to register with the opening in the feeding unit, an inclined shelf provided upon the rear wall of the feeding unit adjacent the opening therein, for the purpose of supporting the feed supply hopper and means for detachably holding the feed supply hopper to the feeding unit.

In testimony whereof we affix our signatures.

ELZA BLOOM.
FRANK BARTH.